United States Patent [19]

Peis

[11] 3,990,359
[45] Nov. 9, 1976

[54] COMPACTOR DEVICES

[76] Inventor: Jens Peis, Hobrovej, 9230 Svenstrup, Denmark

[22] Filed: Apr. 21, 1975

[21] Appl. No.: 569,789

[30] Foreign Application Priority Data

Apr. 23, 1974 Denmark .......................... 2207/74

[52] U.S. Cl. .......................... 100/98 R; 100/187;
100/189; 100/295; 198/746; 198/747
[51] Int. Cl.² ...................... B30B 1/32; B30B 15/08
[58] Field of Search ............ 198/224, 226, DIG. 18;
100/177, 178, 179, 98 R, 192, 189, 142, 233,
216, 41, 187, 295

[56] References Cited
UNITED STATES PATENTS

| 684,062 | 10/1901 | Howard | 198/224 |
|---|---|---|---|
| 947,013 | 1/1910 | Dowd | 100/177 X |
| 1,627,327 | 5/1927 | Hickman | 100/142 |
| 2,727,457 | 12/1955 | Hedtke | 100/98 X |
| 3,103,276 | 9/1963 | Schmitzer | 198/226 |
| 3,134,321 | 5/1964 | Loehnert | 100/98 R |
| 3,680,719 | 8/1972 | Reilly | 198/226 |
| 3,890,889 | 6/1975 | Fishburne | 100/189 X |
| 3,893,385 | 7/1975 | White | 100/192 X |

*Primary Examiner*—Billy J. Wilhite
*Attorney, Agent, or Firm*—Craig & Antonelli

[57] ABSTRACT

A compactor device for refuse material such as garbage, industrial refuse or dung, comprising a housing having a compression chamber formed as a segment in which a swing piston is pivotally reciprocal from a retracted position outside the chamber in which material may be fed to the chamber and through the chamber towards an outlet opening thereof, whereby the material is forced through a tapering channel portion resisting the movement of the material so as to cause the material to be compressed before it leaves the outlet opening.

11 Claims, 4 Drawing Figures

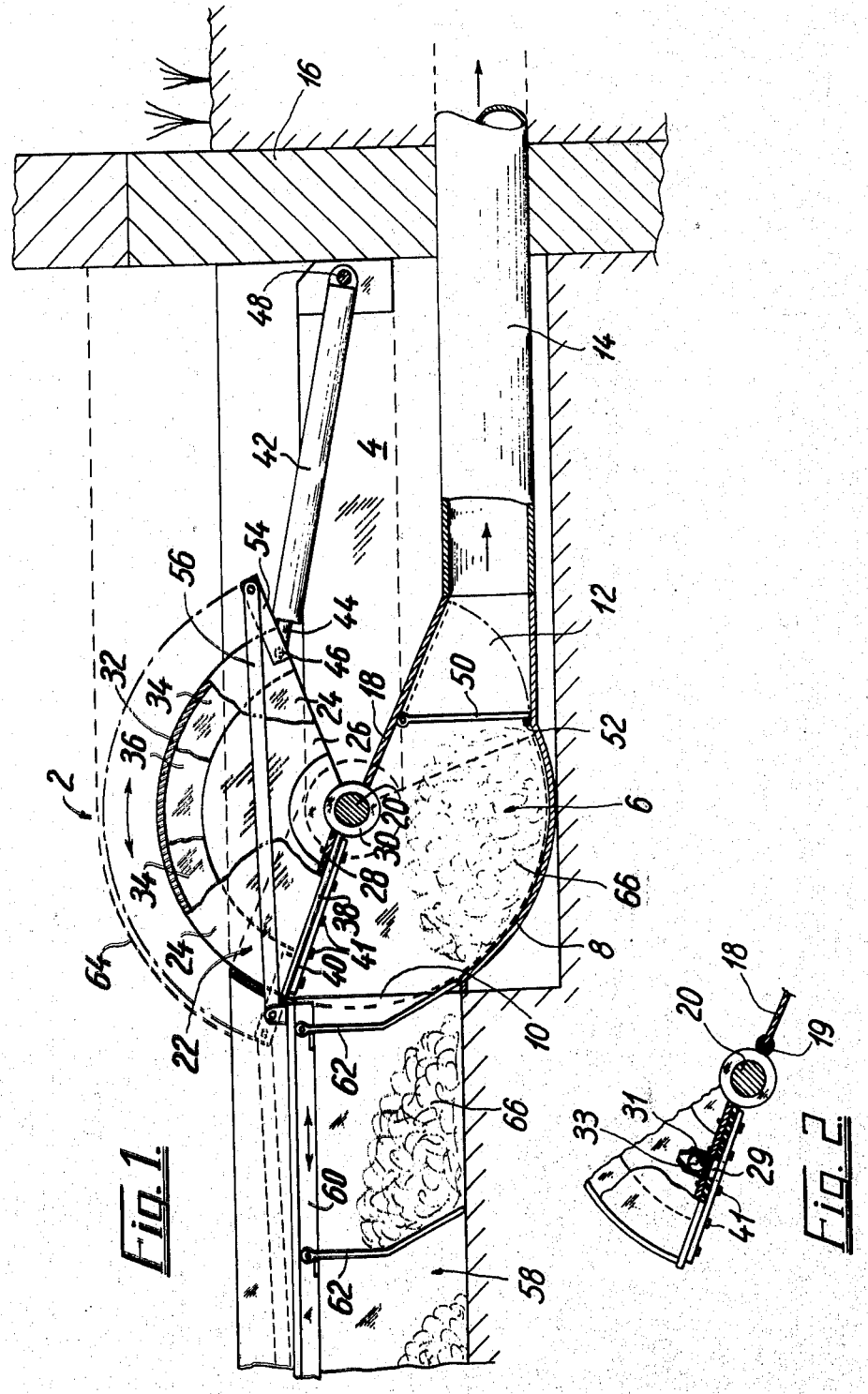

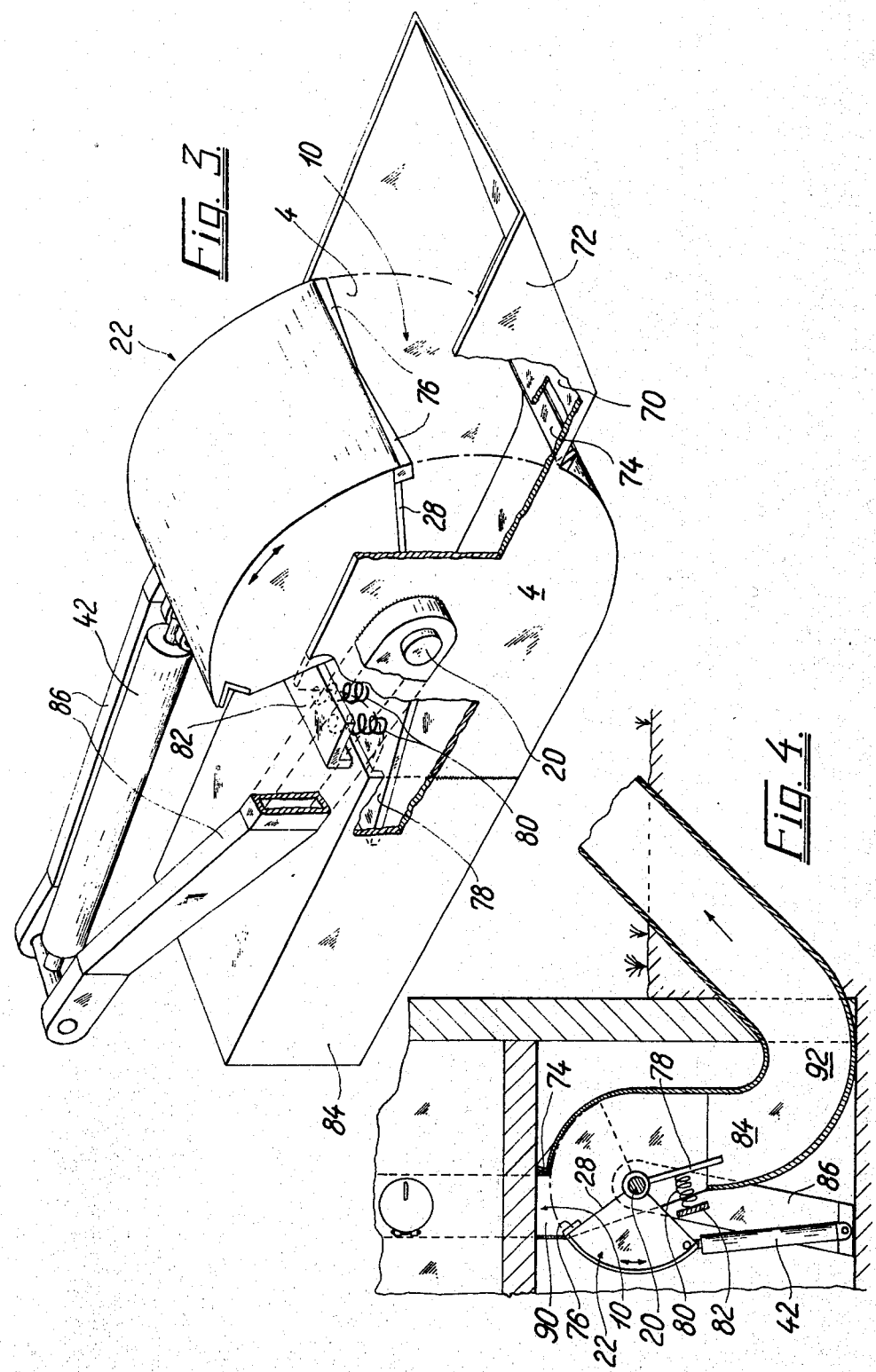

COMPACTOR DEVICES

The present invention relates to a compactor device for refuse material and comprising a housing having a material receiving chamber and an inlet opening and an outlet opening communicating with said chamber, and a compactor piston mounted reciprocally in connection with said housing so as to be movable from a retracted position, in which it allows material to be fed to said chamber through said inlet opening, towards said outlet opening along a path through said chamber.

Conventional compactor devices are made with a tubular housing in which a piston is reciprocable, mounted at the end of a straight piston rod, the inlet opening being a side hole in the tubular housing. With the piston in its retracted position the material is filled into the housing through the inlet opening whereafter the piston is forced forwardly so as to press together the material and displace it towards the outlet end of the tube. The outlet end may be disposed in a refuse receptacle having a movable wall portion which is spring loaded in such a manner that the material delivered through said outlet opening meets a counter pressure from the said wall or from the material already forced into the receptacle in front of said wall, and consequently the piston shall have to compress the material for overcoming this counter pressure.

Compactors of the type referred to are used for handling both industrial and domestic refuse, and a special application thereof is for dung removal from a stable to an outdoor midden area, in which case the dung compactor is used as a pump for transporting the dung collected inside the stable to the midden through an underground pipe.

Practice has shown that in the known compactors or compactor pumps it is difficult to maintain the piston optimally guided, since after some wear the piston may tend to edge itself in the housing tube, and besides the known devices have a long total building length with the hydraulic piston control cylinder mounted in alignment with the housing tube.

It is the purpose of this invention to provide an improved compactor device which is simple in construction and reliable in operation, and is adaptable for effecting a high degree of compacting the material handled by the device.

According to the invention there is provided a compactor device of the type referred to in which the piston is a plate or block member which is swingably connected with the housing so as to be reciprocally pivotal about an axis extending substantially along one edge of the plate or block member, the housing being shaped so as to define a passage for the swing piston, said passage forming part of said material receiving chamber and communicating with said outlet opening through a channel generally tapering towards the outlet opening. In this construction the piston will show no edging tendency, because it is guided in a simple and efficient manner by its pivot connection with the housing, and for the same reason it can be operated with a relatively high force so as to not only cause the material to be rejected from the compacting chamber through the outlet opening, but generally cause the material to be effectively compacted already by forcing the material through the said tapering channel portion before it reaches the outlet opening.

Several other features and advantages of the invention will appear from the following description of the accompanying drawing, in which FIG. 1 is a sectional side view of a compactor device according to the invention used as a dung pump FIG. 2 is a sectional view of a detail of FIG. 1

FIG. 3 is a perspective view, partly in section, of a modified compactor device for general use, and FIG. 4 is a side view of this device used for receiving refuse from a refuse shaft of a dwelling house.

The compactor pump device shown in FIG. 1 is generally designated 2 and comprises two side plates 4 of which only the rearmost is shown. For a better understanding of FIG. 1 reference can be made to FIG. 2 which — though showing a modified embodiment — resembles FIG. 1 as far as the basic constructional features are concerned. The side plates 4 form side walls of a compacting chamber 6 the bottom of which is constituted by an arcuate cross wall portion 8 extending up to the lower edge of an inlet opening 10. Opposite to this opening the chamber 6 communicates with a funnel shaped transition tube 12 forming a channel having a rectangular cross section at the end connected to the chamber 6 and having a circular cross section at its other end which defines an outlet opening connected to a round outlet tube 14 which extends out through the wall 16 of a stable in which the device is mounted. Outside the stable building the tube 14 extends underground to a midden area (not shown) in which the tube is let up to the ground surface.

Between the side plates 4 is arranged a rear upper wall plate 18 of the chamber 6 and a horizontal pivot shaft 20 serving to pivotally hold a compacting piston element generally designated 22 and comprising two opposed side walls 24 and 26 formed as segments of a circular plate. A crosswise arranged front wall portion 28 forms the active part of the piston element 22 and projects radially outwardly from a tube bushing 30 rotatably mounted on the pivot shaft 20, the side walls 24 and 26 also being connected with the tube bushing 30. Along the opposed peripheral edges of the side wall segments is mounted a correspondingly arched cross plate 32 provided with reinforcing ribs 34 and 36 at the inside thereof.

The front surface of the piston front plate 28 is covered by a plate or layer 38 of a resilient material such as rubber secured to the plate 28 by means of a holding and covering plate 40 and a number of bolts 41 in such a manner that the free edges of the rubber plate 38 project beyond the edges of the piston front plate for sealing against the wall portions 4 and 8 when the piston is in operation. As the edges of the rubber plate become worn the bolts 41 may be retightened whereby the rubber edges will again be brought to protrude from the piston plate 28.

The swing piston 22 is connected with a double acting hydraulic cylinder 42 the piston rod 44 of which is pivotally connected with the swing piston at a hinge point 46 between the outer ends of the reinforcing ribs 34 and 36. The other end of the cylinder 42 is pivoted at 48 to a rigid chassis portion of the device.

The swing piston 22 is shown in its initial position in which material to be compacted is introducible into the chamber 6 through the inlet opening 10, and when thereafter the cylinder 42 is operated to swing the piston anticlockwise the front plate system 28, 38, 40 of the piston will be swung downwardly and rearwardly through the chamber 6 so as to compress the material therein and force the material rearwardly through the transition tube 12 into the tube 14. A top hinged swing plate 50 in the tube portion 12 serves as a check valve which allows the material to be forced into the tube 14 but prevents the material from running back from the tube 14, when the piston element 22 is swung back again since in that case the plate 50 will swing down against a stop 52 and thus close the rear entrance to the chamber 6.

Adjacent the rear end of swing piston 22 the side plates 24 and 26 are provided with exterior, radially outwardly projecting arms 54 to the outer end of each of which there is pivotally secured one end of a lever 56, the other end of which is pivotally secured to a horizontally sliding beam system 60 arranged in connection with a dung groove 58 in the stable. The beam system 60 is adapted to be reciprocated in the horizontal direction and carries a number of pivotally suspended dung scrapers 62 which are operable to scrape the dung along the groove 58 when moved towards the right, while when moved towards the left they are passively swung upwardly so as to pass the dung lying behind them.

The entire compactor or pump device may be covered by a cover plate 64 shown in dotted lines.

When the cylinder 42 — by control means not shown — is caused to reciprocate the piston rod 44 the operation of the system will be as follows: Each time the piston rod 44 is moved towards the left the piston element 22 will be swung down into the chamber 6, and at the same time the levers 56 will cause the beams 60 and therewith the dung scrapers 62 to move towards the left. Thereafter the motion is inverted and the piston is swung to its retracted or initial position while the dung scraper 62 nearest the opening 10 causes an amount of dung to be let through the opening 10 into the chamber 6. Then, when the swing piston is again actuated to swing downward, this dung portion will be forced towards the tubes 12 and 14 whereby the check valve plate 50 will be swung upwardly as shown in dotted lines. By repeated operation of the piston further dung portions will be admitted to the chamber 6, and each portion will be compressed in the chamber and forced into the narrower tube 14, through which the dung will be delivered to the said midden area.

Since also liquid dung is to be handled by the compactor pump care should be taken that the chamber 6 be well sealed during the working stroke of the piston. The rubber plate 38 serves this purpose, but of course it may be replaced by other suitable sealing means extending along the three free edges of the front piston plate. A seal should be provided also between the free edge of the plate 18 and the outside of the tube bushing 30, this being obtainable, e.g., as shown in FIG. 2 by means of a sealing strip 19 mounted along the plate edge.

When the wet dung has been compressed by the piston element 22 the retraction of the piston may generate a vacuum in front of the piston plate. For facilitating the retraction of the piston, therefore, the sealing means could be made as check valve means, like in a bicycle pump, or — as shown in FIG. 2 — the piston plate may have one or more holes behind which is mounted a valve housing 31 for a check valve member 33 arranged so as to be closed by an overpressure in the chamber 6 and opened for admitting air to the chamber 6 by the return stroke of the piston.

In practice it may be preferable to let the bottom portion of the tubes 12 and 14 be tangential to the bottom portion 8 of the pump housing and to avoid the direct drive connection between the cylinder 42 and the dung conveying equipment 60, 62 whereby this latter may be of any suitable type.

The compactor device shown in FIG. 3 is basically similar to the above described device, but it is intended to handle dry or semi-dry industrial or domestic refuse. Therefore, it should not necessarily be provided with the said sealing means. The inlet opening 10 is defined between the side plates 4 and the front edge of a bottom plate 70 in a funnel like refuse receiving box 72. Along the said front edge there is mounted a stationary knife member 76 mounted along the outer free edge of the piston front plate 28, whereby even heavy refuse pieces such as metal plates or wooden beams crossing the knife member 74 will be cut when the piston carries out its working stroke. The piston knife 76 is inclined so as to make the cutting progressive along the knife 74 from both sides or ends towards the middle thereof.

The upper rear wall of the compressing chamber is constituted by an inclined swing plate 78 which along one edge thereof is rotatably connected with the main shaft 20 of the piston element 22, the top side of the plate 78 bearing against a number of strong compression springs 80 inserted between the plate 78 and a rigid cross beam 82. In normal operation the swing plate 78 will constitute a tapering wall which narrows the compression chamber towards an outlet opening defined by the outer free edge of the swing plate, but the plate may yield against the action of the springs 80 if it is passed by a particularly hard and large refuse article. Even when the plate is thus swung somewhat upwardly it will still contribute to the following material being compacted in the compression chamber, due to its strong frictional engagement with the material.

The device shown in FIG. 4 is provided with an outlet tube portion 84 the top side of which is situated at a level above the outer edge of the plate 78, i.e., so as to have increased cross section relatively to the said outlet opening. Due to the enlarged cross section of the tube it is relatively easy for the piston element to force a "sausage" of compacted refuse material through the tube, so it may be short or long according to the requirements. The outer tube end may extend into a refuse container or just be situated above some recipient for the compacted refuse material.

The cylinder 42 may be arranged almost parallel with the tube 84, preferably carried by a pair of heavy beams 86 which are rigidly secured to the respective side plates 4 adjacent the shaft 20. It will be appreciated that the device itself is a rather compact unit and that it can handle a flow of material (FIG. 1) without substantially changing the direction of the flow. The inlet opening 10 is blocked by the arched plate 32 when the piston is in operation.

FIG. 4 illustrates the compactor device mounted underneath a refuse shaft 90 in a dwelling house. The basic construction of the device is the same as in FIG. 3, and similar parts are identified by similar numerals. The outlet tube 84 is bent at 92 and is extended upwardly to a suitable recipient (not shown) for the compacted garbage "sausage" produced by the device.

Generally, in order to maintain reasonably small dimensions of the device, the swing piston should be swingable through at least 70°, preferably through 100°–120°, and for obtaining a good compacting effect at least 25%, preferably about 50%, of the length of the working stroke should be within the compression chamber 6.

When the compactor device is used for dry or semi dry material the outlet tube should preferably be of rectangular cross section.

What is claimed is:

1. A compactor device for refuse material comprising a housing having a material receiving chamber and an inlet opening and an outlet opening communicating with said chamber and a compactor swing piston mounted reciprocally in connection with said housing so as to be movable from a retracted position in which it allows material to be fed to said chamber through said inlet opening, towards said outlet opening along a path through said chamber characterized in that the piston includes plate means swingably connected with the housing so as to be reciprocally pivotal about an axis extending substantially along one edge of the plate means, the housing being shaped so as to define a passage for the swing piston, said passage forming part of said chamber and communicating with said outlet opening through a channel portion generally tapering towards the outlet opening.

2. A compactor device according to claim 1, in which the swing piston is swingable through at least 70°, preferably through 100°–120°, and in which at least 25% of its working stroke movement, preferably about 50% thereof, takes place entirely inside said passage.

3. A compactor device according to claim 1, in which the outer free edge of the swing piston is provided with a knife member cooperating with a stationary knife member mounted along the edge of the inlet opening.

4. A compactor device according to claim 1, in which said tapering channel portion includes a spring loaded wall portion capable of being forced resiliently outwardly by a high internal pressure in said channel portion.

5. A compactor device according to claim 4, wherein said spring loaded wall portion is rotatably connected along one edge thereof to said swing piston for rotation about the center axis of said swing piston, one side of said wall portion bearing against a plurality of compression springs disposed between said one side of said swing piston and relatively rigid means for securing said plurality of compression springs.

6. A compactor device according to claim 1, in which to said outlet opening there is connected a tube for guiding the compacted material to a discharge position, the cross sectional area of said tube preferably being larger than said outlet opening.

7. A compactor device according to claim 1, wherein said material receiving chamber includes a bottom portion having an arcuate cross wall portion extending to a lower edge of said inlet opening, said arcuate cross wall portion cooperating with said swing piston to define a compression chamber in which the refuse material is compacted by the action of said swing piston in said compression chamber.

8. A compactor device according to claim 7, wherein said swing piston includes lever means pivotally secured at one end thereof to said swing piston, the oppositely disposed end of said lever means being pivotally secured to a horizontally sliding beam assembly disposed in said inlet opening, said beam assembly further including a plurality of scraper means pivotally suspended from said beam assembly, said lever means and said swing piston cooperating to reciprocate said sliding beam assembly horizontally whereby said pivotally suspended scraper means operate to move the refuse material in said inlet opening toward said compression chamber.

9. A compactor device according to claim 7, wherein said arcuate cross wall portion extends to a lower edge portion of said outlet opening and said outlet opening includes swing plate means disposed at the entrance of said outlet opening, said swing plate means being constructed for one way swing movement whereby refuse material in said outlet opening is prevented from reentering said compression chamber.

10. A compactor device according to claim 7, wherein about 50% of the working stroke of said swing piston occurs within said compression chamber.

11. A compactor device according to claim 1, wherein said plate means includes resilient means secured to said plate means in sealing engagement with wall portions of said material receiving chamber whereby said chamber is sealed during the working cycle of said swing piston.

* * * * *